US008874686B2

(12) United States Patent
Jun et al.

(10) Patent No.: US 8,874,686 B2
(45) Date of Patent: Oct. 28, 2014

(54) DDS STRUCTURE WITH SCALABILITY AND ADAPTABILITY AND NODE CONSTITUTING THE SAME

(75) Inventors: Hyung Kook Jun, Seoul (KR); Soo Hyung Lee, Daejeon (KR); Kyeong Tae Kim, Chungcheon (KR); Jae Hyuk Kim, Seoul (KR); Won Tae Kim, Asan (KR); Seung Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 298 days.

(21) Appl. No.: 13/211,839

(22) Filed: Aug. 17, 2011

(65) Prior Publication Data

US 2012/0117186 A1 May 10, 2012

(30) Foreign Application Priority Data

Nov. 4, 2010 (KR) ........................ 10-2010-0109306

(51) Int. Cl.
*G06F 15/16* (2006.01)
*G06F 9/54* (2006.01)

(52) U.S. Cl.
CPC ..................................... *G06F 9/545* (2013.01)
USPC ........................................................ 709/217

(58) Field of Classification Search
CPC .................... H04L 29/06108; H04L 41/5087; H04L 65/00; H04L 47/2416; H04L 51/04; H04L 65/1006; H04L 65/4007; H04L 65/1066; H04L 65/1069; H04L 65/1083; H04L 65/601; H04L 65/80; H04L 29/06414; H04L 12/1895; H04L 12/2493; H04L 29/06176; H04L 29/06027; H04L 29/12009; H04L 29/12028; H04L 29/12924; H04L 61/103; H04L 61/6063; H04L 65/103; H04L 65/608; H04L 69/16; H04L 69/161; H04L 69/162; H04L 69/32; H04L 29/08576; H04L 65/1529; H04L 61/2564; H04L 12/2494; H04L 29/08117
USPC ........................................ 709/217; 370/395.52
See application file for complete search history.

(56) References Cited

U.S. PATENT DOCUMENTS

| 6,614,781 | B1 * | 9/2003 | Elliott et al. .................. 370/352 |
| 7,031,314 | B2 * | 4/2006 | Craig et al. ................... 370/392 |
| 7,533,128 | B1 * | 5/2009 | Sanchez et al. ..................... 1/1 |
| 7,742,429 | B1 * | 6/2010 | Huang et al. .................. 370/254 |
| 7,783,853 | B1 * | 8/2010 | Rhee et al. .................... 711/170 |
| 2003/0012180 | A1 * | 1/2003 | Donahue et al. .............. 370/352 |
| 2003/0174688 | A1 * | 9/2003 | Ahmed et al. ................ 370/349 |
| 2007/0118842 | A1 | 5/2007 | Weida |
| 2009/0248612 | A1 | 10/2009 | Morris |
| 2010/0008245 | A1 * | 1/2010 | Viger et al. ................... 370/252 |

OTHER PUBLICATIONS

OMG Object Management Group The Real-time Publish-Subscribe Wire Protocol DDS Interoperability Wire Protocol Specification, Jun. 2008.*
"Data Distribution Service for Real-Time Systems Specification," Version 1.1, dated Dec. 2005. See http://www.OMG.org/docs/formal/05-12-04.pdf or http://www.cisst.org/cisst/dds/DDS-03-07-07.pdf.*

* cited by examiner

*Primary Examiner* — Joseph E Avellino
*Assistant Examiner* — Deforrest Bailey (57) ABSTRACT

A node constituting data distribution service (DDS) structure according to an exemplary embodiment of the present invention includes a first DDS application including a first DCPS layer and a first real-time publish-subscribe (RTPS) layer and a second DDS application including a second DCPS layer communicated with the first RTPS layer.

19 Claims, 11 Drawing Sheets

| RTPS SOCKET | RTPS SOCKET SETTING INFORMATION (DOMAINPARTICIPANT ID, TOPIC ID, DATEREADER.....) |
|---|---|
| S1 | (1, 1, 3,....) |
| S2 | (2, 1, 3,....) |
| ⋮ | ⋮ |

DDS STRUCTURE WITH SCALABILITY AND ADAPTABILITY AND NODE CONSTITUTING THE SAME

CROSS-REFERENCE TO RELATED APPLICATIONS

This application claims priority to and the benefit of Korean Patent Application No. 10-2010-0109306 filed in the Korean Intellectual Property Office on Nov. 4, 2010, the entire contents of which are incorporated herein by reference.

TECHNICAL FIELD

The present invention relates to data distribution service (hereinafter, referred to as DDS), and more particularly, to a DOS structure with scalability and adaptability and a node constituting the same.

BACKGROUND

A DOS is a standard specification of middleware for data-centric publish-subscribe communication between distributed application programs and has been standardized in an object management group (CMG). The DDS generally includes a domain which is a shared area and domain participants, and the domain participants are classified into publishers and subscribers for each datum. In one domain, a plurality of publishers and subscribers exist and exchange samples of topics having a predetermined data type.

The structures of existing DDS products are generally classified into a decentralized structure and a federated structure. The decentralized structure is a structure in which each of DDS applications of one node has a data-centric publish-subscribe (DCPS) layer and a real-time publish-subscribe (RIPS) layer and performs a DDS service. This structure has advantages in that a small number of DDS applications are driven and operate without a separate daemon but has disadvantages in that a process of developing the DCPS layer and the RTPS layer is complex and problems may occur in discovery in the case where a lot of nodes participate in the DDS domain. The federated structure is a structure in which individual DCPS layers commonly use a daemon type RTPS layer. This structure has less complexity than the decentralized structure and is more appropriate for a large-scale system. However, the federated structure incurs additional inter-process communication expense and a problem of the daemon type RTPS layer influences the whole system.

SUMMARY

The present invention has been made in an effort to provide a DDS with scalability and adaptability and a node constituting the same.

An exemplary embodiment of the present invention provides a node constituting a DDS structure which includes a kernel module being modifiable and including a first real-time publish-subscribe (RTPS) layer in which a part of RTPS functions is implemented, and a DDS application including a data-centric publish-subscribe (DCPS) layer and a second RTPS layer in which the other RTPS functions.

The part of the RIPS functions may include at least one of a discovery function, a data reception function, and an RTPS message generating function.

The other RTPS functions may include at least one of a historycache function and an RTPS message control function.

The second RTPS layer may include an RTPS socket performing connection between the second RIPS layer and the first RIPS layer and receive data received by the first RTPS layer from the first RTPS layer in a socket form.

The first RTPS layer may include an RTPS socket for data communication with a network and transmits data received through the socket to the second RIPS layer.

Another exemplary embodiment of the present invention provides a node constituting a DDS structure which includes a first DDS application including a first DCPS layer and a first RTPS layer, and a second DDS application including a second DCPS layer communicated with the first RTPS layer.

The first DCPS layer may include a server IPC connection structure which is an IPC connection structure for enabling the second DDS application to use the first RTPS layer, and the second DCPS layer may include a client IPC connection structure which is an IPC connection structure for enabling the second DDS application to use the first RTPS layer.

The server IPC connection structure or the client IPC connection structure may be any one of a shared memory, a message queue, and a socket.

The first DCPS layer may include a local API for enabling the first DDS application to use the first RTPS layer.

Yet another exemplary embodiment of the present invention provides a DDS structure which includes a first node including a first DDS application having a first DCPS layer and an RTPS layer, and a second node including a second DDS application having a second DCPS layer communicated with the first RTPS layer.

The first node and the second node may belong to the same DDS domain.

The first node may belong to a DDS domain and the second node belongs to an external WAN environment of the DDS domain.

The first DCPS layer may include a server IPC connection structure which is an IPC connection structure for enabling the second DDS application to use the first RTPS layer, and the second DCPS layer may include a client IPC connection structure which is an IPC connection structure for enabling the second DDS application to use the first RTPS layer.

The server IPC connection structure or the client IPC connection structure may be any one of a shared memory, a message queue, and a socket.

The first DCPS layer may include a local API for enabling the first DDS application to use the first RTPS layer.

According to the exemplary embodiments of the present invention, some functions of a RTPS layer including a message receiving function are implemented as a socket of a kernel module. Therefore, it is possible to simplify the discovery function of the RTPS layer and reduce a message response time between nodes.

Also, according to the exemplary embodiments of the present invention, a plurality of DCPS layers share one RTPS layer. Therefore, it is possible to simplify the discovery function of the RIPS layer. Moreover, the RTPS layer and the DCPS layers can perform efficient communication between processors by using an IPC connection structure.

Further, according to the exemplary embodiments of the present invention, DDS applications of a plurality of nodes belonging to the same domain can use an RTPS layer of a DDS application of a specific node of the plurality of nodes. Therefore, it is possible to suppress propagation of discovery and more efficiently perform message communication between nodes.

Furthermore, according to the exemplary embodiments of the present invention, an external DDS application which could not participate in a DDS domain can use a DDS from the external of the DDS domain without a DDS router by using an RTPS layer of a DDS application of a participant node constituting the DDS domain.

DETAILED DESCRIPTION

Hereinafter, exemplary embodiments of the present invention will be described in detail with reference to the accompanying drawings. In this description, when any one element is connected to another element, the corresponding element may be connected directly to another element or with a third element interposed therebetween. First of all, it is to be noted that in giving reference numerals to elements of each drawing, like reference numerals refer to like elements even though like elements are shown in different drawings. The components and operations of the present invention illustrated in the drawings and described with reference to the drawings are described as at least one exemplary embodiment and the spirit and the core components and operation of the present invention are not limited thereto.

Figure 1:
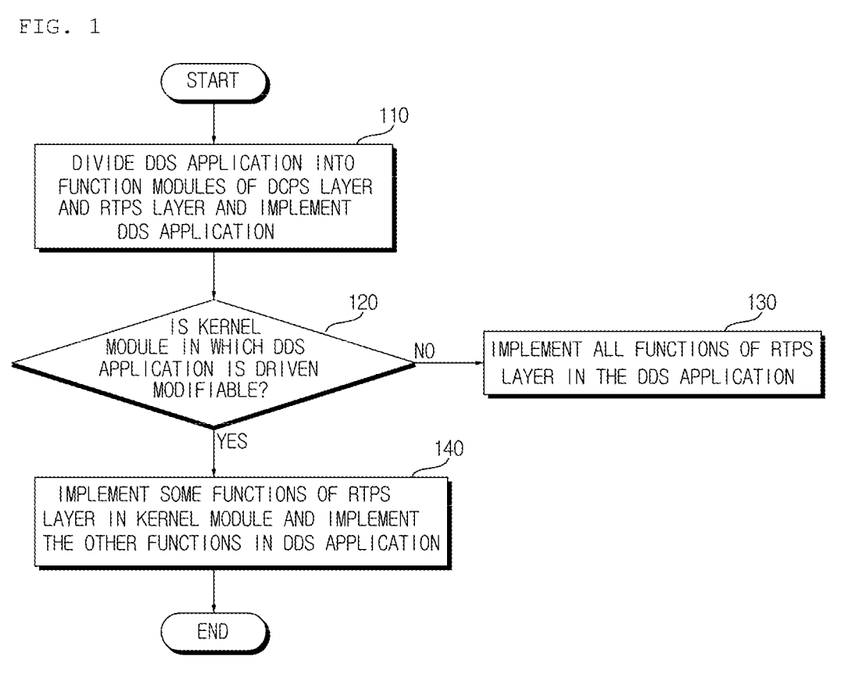
FIG. 1 is a flow chart illustrating a method of implementing a DDS application according to an exemplary embodiment of the present invention.

FIG. 1 is a flow chart illustrating a method of implementing a DDS application according to an exemplary embodiment of the present invention.

First, a DDS application is divided into function modules of a DCPS layer and an RTPS layer, which are implemented (step 110). The DCPS layer is a data publish-subscribe function interface provided to an application program and the application program executes publication and subscription of desired data without perceiving another application program for data exchange. The DCPS layer provides a data exchange function between application programs in a write/read method by providing API of a read( )/write( ) form. The RIPS layer is a layer in which actual data is published and subscribed by a publisher and a subscriber, determines domain formation and the type of data to be used, and discovers a domain participant participating in a domain. Further, the RIPS layer performs an RIPS message control function such as a HistoryCache function, a data receiving function, an RIPS message generating function, etc.

Next, it is determined whether a kernel module in which the DDS application is driven is modifiable (step 120). Examples of a modifiable kernel module may include a Linux kernel module, etc. If the kernel module is not modifiable, like the related art, all functions of the RIPS layer are implemented in the DDS application (step 130).

If the kernel module is modifiable, some functions of the functions of the RIPS layer is implemented in the kernel module and the other functions are implemented in the DDS application (step 140). Here, some functions to be implemented in the kernel module include a discovery function, the data receiving function, the RIPS message generating function, etc., and may be implemented by a socket of the kernel module. At this time, some functions of the RIPS layer is included in the kernel module to be implemented as a first RIPS layer, and the other functions of the RIPS layer, such as the HistoryCache function, the RIPS message control function, etc., are implemented in a middleware form in the DDS application as a second RIPS layer. Hereinafter, the first RIPS layer is referred to as a low-level RIPS layer and the second RIPS layer is referred to as a high-level RIPS layer.

Figure 2:
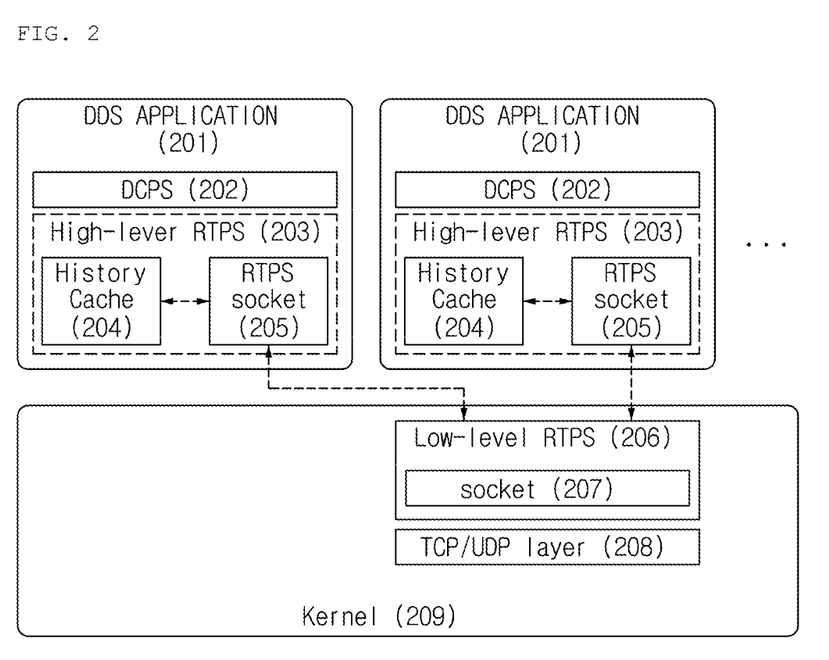
FIG. 2 illustrates a structure of a node constituting a DDS structure according to an exemplary embodiment of the present invention.

FIG. 2 shows a structure of a node constituting a DDS structure according to an exemplary embodiment of the present invention, more specifically, a structure of a node having a DDS application implemented through the step 140. Here, the node means a computing device which may be a DDS domain participant.

The node according to the exemplary embodiment is configured to include a modifiable kernel module 209 and at least one DDS application 201 driven on the kernel module 209. The DDS application 201 includes a DCPS layer 202 and a high-level RIPS layer 203, and the kernel module 209 includes a low-level RIPS layer 206 and a TCP/UDP layer 208. The high-level RIPS layer 203 includes a HistoryCashe 204 and an RIPS socket 205, and the low-level RIPS layer 206 includes a socket 207. As shown in FIG. 2, in the node, a plurality of DDS applications 201 having the same structure may exist.

The DDS application 201 is an application program generating the DCPS layer and the RIPS layer (the high-level RIPS layer and the low-level RIPS layer). The DCPS layer 202 is an API layer of the DDS application 201 and allows the application program to use a DDS. The high-level RIPS layer 203 performs control on an RTPS message and manages the HistoryCashe 204 and the RIPS socket 205. The HistoryCashe 204 performs control regarding reception of an RIPS message and performs a function of storing ACK, NAK, and received data. The RTPS socket 205 performs a function of linking the high-level RIPS layer 203 and the low-level RTPS layer 206 to each other, and receives data which the low-level RIPS layer 206 receives from the low-level RIPS layer 206 in a socket form.

The low-level RIPS layer 206 performs the discovery function, the data receiving function, and the RTPS message generating function. The low-level RTPS layer 206 converts an RIPS serialized message transmitted through an actual network socket into an RIPS message form, and processes and transmits data on the basis of the RIPS message such that the high-level RTPS layer 203 can the data. The socket 207 corresponds to a network socket for actually transmitting and receiving data to and from a network.

As shown in FIG. 2, in the case where a plurality of DDS applications 201 exist, the RTPS sockets 205 of the individual DDS applications 201 perform data transmission and reception with the socket 207 of one low-level RIPS layer 206. That is, the plurality of DDS applications 201 share one low-level RTPS layer 206.

Figure 3:
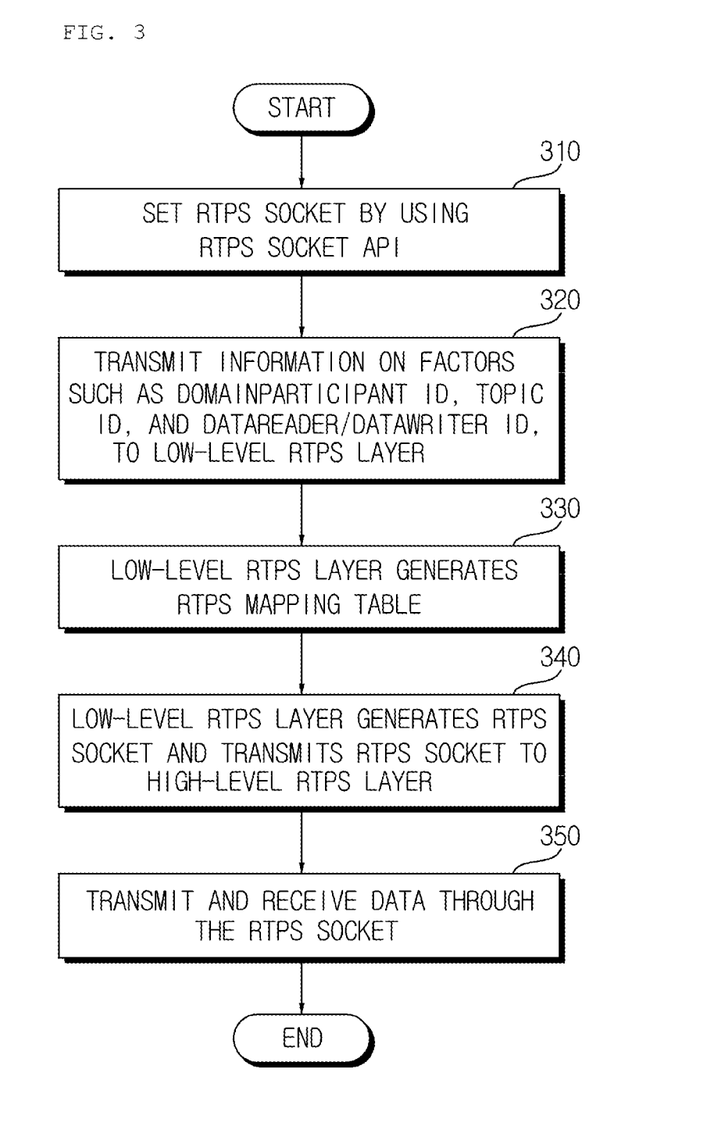
FIG. 3 is a flow chart illustrating a process of generating and using the RTPS socket 205 in the structure shown in FIG. 2.

FIG. 3 is a flow chart illustrating a process of generating and using the RIPS socket 205 in the structure shown in FIG. 2. The DDS application 201 sets the RTPS socket 205 by using an RIPS socket API (step 310). The high-level RIPS layer 203 transmits information on factors for the RIPS socket 205, such as a Domainparticipant ID, a Topic ID, and a Datareader/Datawriter ID, to the low-level RIPS layer 206 (step 320). The low-level RIPS layer 206 generates an RIPS mapping table on the basis of the received information (step S330). The RIPS mapping table is registration information on the RIPS socket 205, and the low-level RIPS layer 206 maps the RIPS data received through the socket 207 to the RTPS socket 205 on the RIPS mapping table and transmits the data to the RIPS socket 205.

Figure 4:
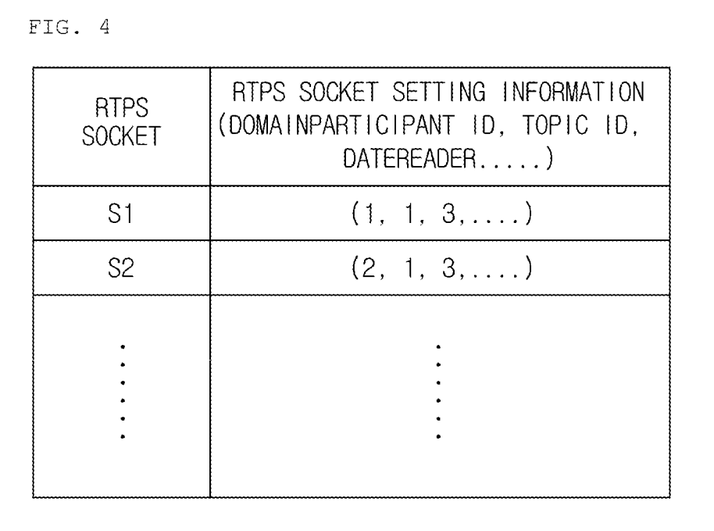
FIG. 4 shows an example of an RTPS mapping table.

FIG. 4 shows an example of the RIPS mapping table. Referring to FIG. 4, the RTPS mapping table includes ID numbers S1, S2, ... of RIPS sockets 205, and RIPS socket setting information mapped with the ID numbers such as the Domainparticipant ID, the Topic ID, and Datareader/Datawriter ID. The RIPS mapping table is maintained in the low-level RTPS layer 206. The low-level RTPS layer 206 generates the RIPS socket 205 on the basis of the RIPS mapping table and transmits the RIPS socket 205 to the high-level RIPS layer 203 (step 304). Then, the high-level RIPS layer 203 transmits and receives data through the RIPS socket 205 (step 350).

According to the exemplary embodiment of the present invention, some functions of the RIPS layer including the message receiving function are implemented as the socket of the kernel module. Therefore, it is possible to simplify the discovery function of the RIPS layer and reduce a message response time between nodes.

Figure 5:
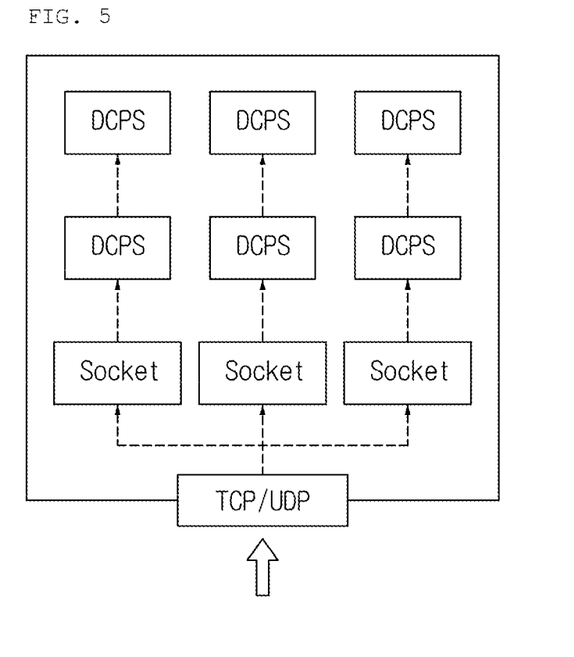
FIG. 5 is a view schematically illustrating a decentralized structure.

FIG. 5 is a view schematically illustrating a decentralized structure. According to the decentralized structure, data received through a TCP/UDP layer passes through a socket, an RIPS layer, and a DCPS layer which correspond to each DDS application. A DDS structure according to an exemplary embodiment of the present invention to be described below is a structure with scalability and adaptability, and may adaptably support not only the decentralized structure but also a federated structure and appropriately respond to a change according to a node in a domain or a DDS application.

Figure 6:
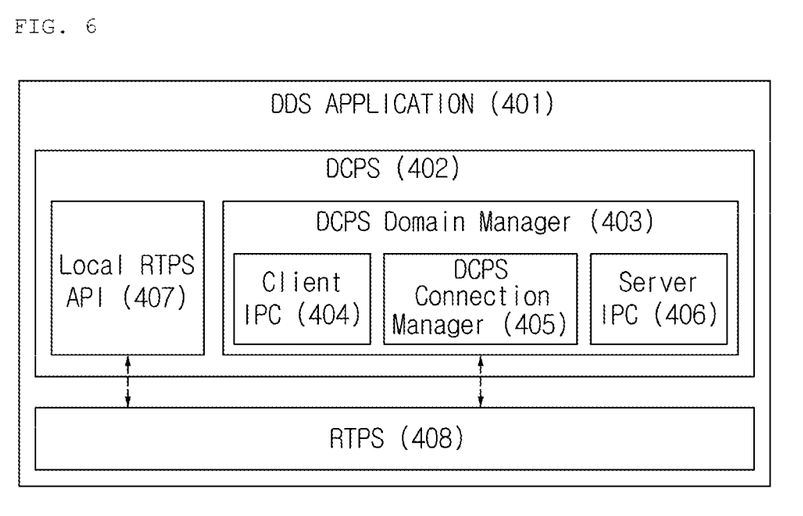
FIG. 6 shows a configuration of a DDS application for a DDS structure according to an exemplary embodiment of the present invention.

FIG. 6 shows a configuration of a DDS application for a DDS structure according to an exemplary embodiment of the present invention. A DDS application 401 includes a DCPS layer 402 and an RIPS layer 408, and the DCPS layer 402 includes an RIPS API 407 and a DCPS domain manager 403. Further, the DCPS domain manager 403 includes a client IPC connection structure 404, a DCPS connection manager 405, and a server IPC connection structure 406.

A local RIPS API 407 is a local application programming interface (API) for enabling the DDS application 401 to use the RIPS layer 408 of the DDS application 401. The DCPS domain manager 403 performs a function of enabling the DDS application 401 to use an RIPS layer of another DDS application or enabling another DDS application 401 to use the RIPS layer 408 of the DDS application 401. Here, 'another DDS application' means another DDS application of the same node, or an DDS application of another node in the same domain, or an external node, that is, a DDS application of another node in a wide area network (WAN) environment. The client IPC connection structure 404 is an IPC (interprocess communication) connection structure for enabling the DDS application 401 to use an RIPS layer of another DDS application, not the RIPS layer 408 of the DDS application 401. Here, the IPC connection structure may be a shared memory, a message queue, a socket, etc. The server IPC connection structure 406 is an IPC connection structure for enabling another DDS application to use the RTPS layer 408 of the DDS application 401. The DCPS connection manager 405 controls the client IPC connection structure 404 and the server IPC connection structure 406 and provides information necessary for the client IPC connection structure 404 and the server IPC connection structure 406 (for example, information on an RTPS layer to be commonly used).

Figure 7:
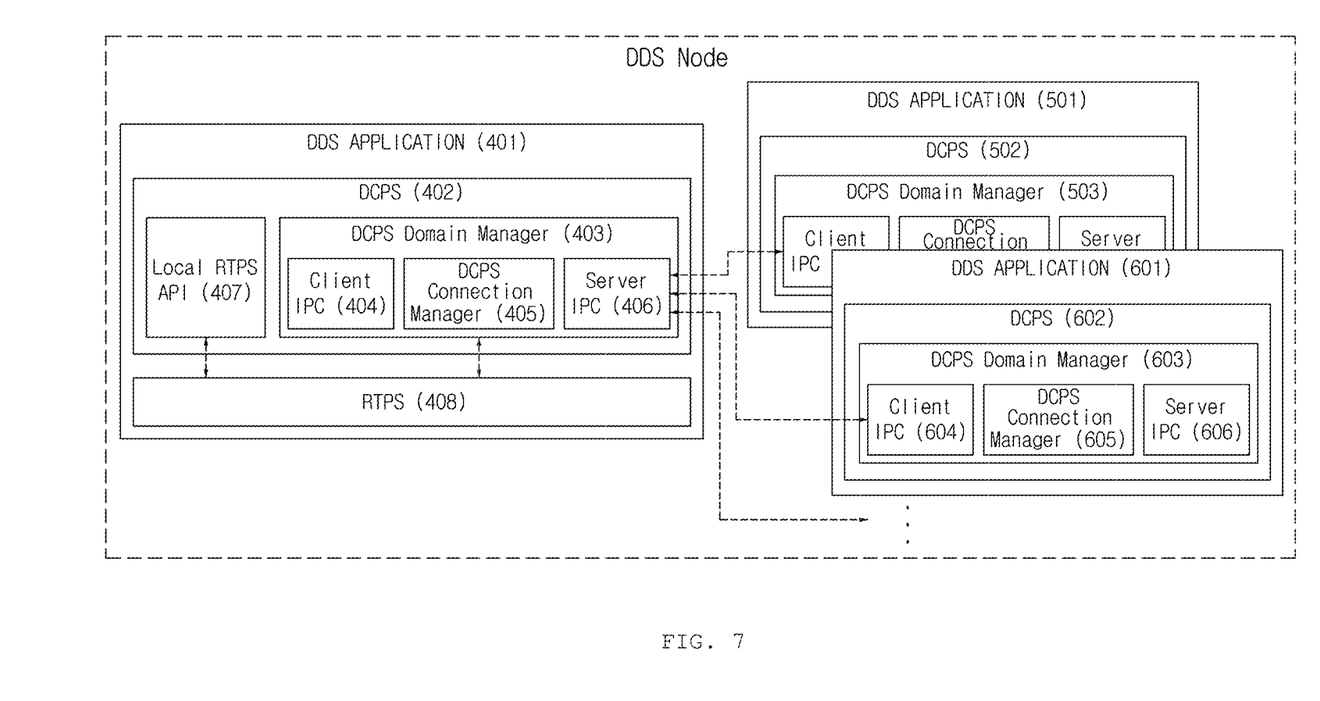
FIG. 7 shows a node constituting a DDS structure according to an exemplary embodiment of the present invention.

FIG. 7 shows a node constituting a DDS structure according to an exemplary embodiment of the present invention including a plurality of DDS applications sharing an RIPS layer of a specific DDS application. Referring to FIG. 7, a DDS application 401 includes an RIPS layer 408 and the DDS application 401 uses the RIPS layer 408 of the DDS application 401 by using a local RIPS API 407. Meanwhile, another DDS application 501 or 601 does not include an RTPS layer and uses the RIPS layer 408 of the DDS application 401. Therefore, the DDS application 501 or 601 does not need a local RIPS API. In order for the DDS application 601 to the RIPS layer 408 of the DDS application 401, a client IPC connection structure 604 of the DDS application 601 is connected to a server IPC connection structure 406 of the DDS application 401 such that a DCPS layer 602 and the RIPS layer 408 communicate with each other.

According to the exemplary embodiment of the present invention, a plurality of DCPS layers share one RIPS layer. Therefore, it is possible to simplify the discovery function of the RIPS layer. Moreover, the RIPS layer and the DCPS layers can perform efficient communication between processors by using an IPC connection structure (a shared memory, a message queue, or a socket).

Figure 8:
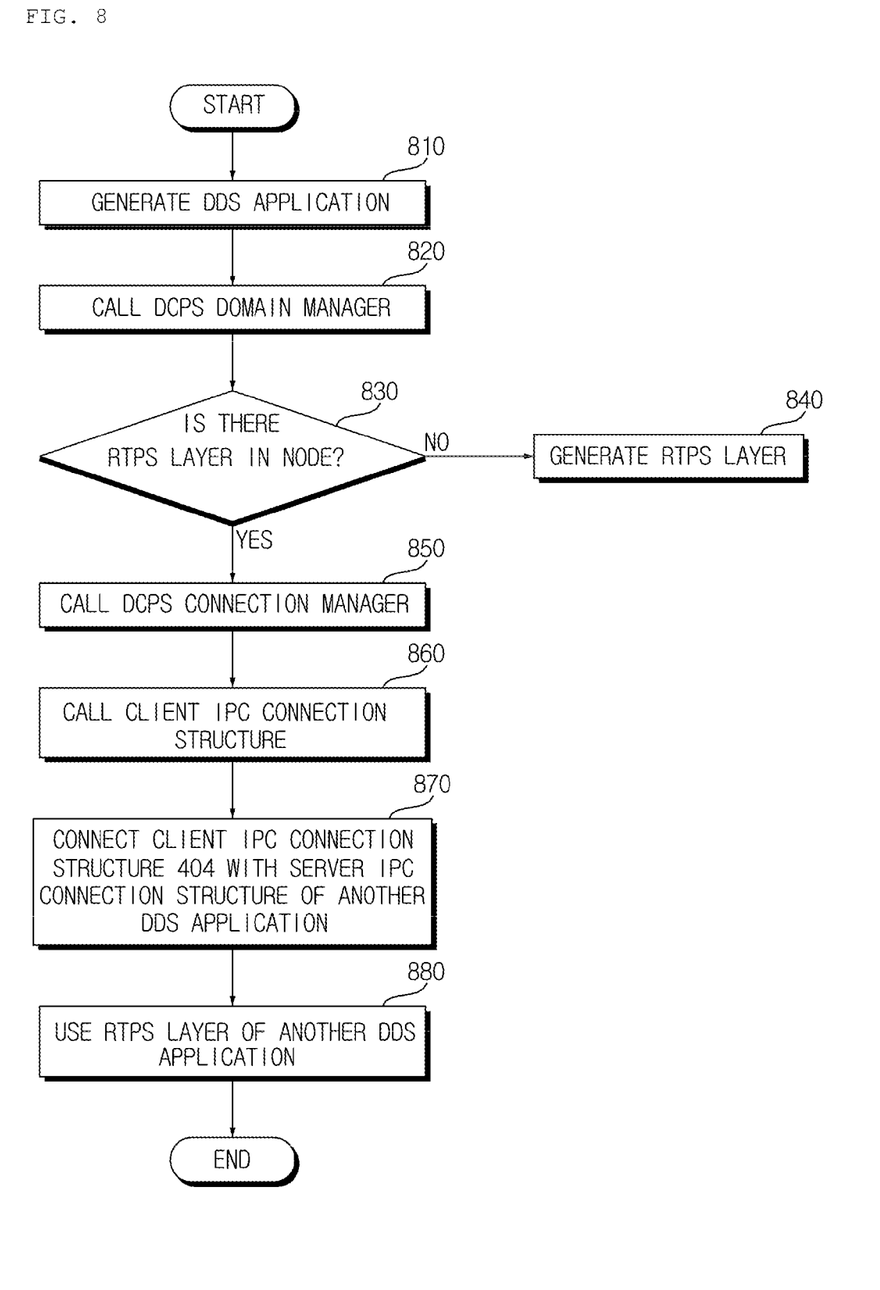
FIG. 8 is a flow chart illustrating a process through which a plurality of DDS applications of one node share a RTPS layer of a specific DDS application of the node.

FIG. 8 is a flow chart illustrating a process through which a plurality of DDS applications of one node share a RIPS layer of a specific DDS application of the node as shown in FIG. 7.

If a DDS application 601 is generated in a node (step 810), the DDS application 601 calls a DCPS domain manager 403 (step 820). Then, the DCPS domain manager 603 checks whether there is an RIPS layer which is being executed in advance in the node (step 830). If there is no RIPS layer which is being executed in advance in the node, the DDS application 601 generates an RIPS layer by itself (step 840).

If there is an RIPS layer which is being executed in advance in the node, the DCPS domain manager 603 calls a DCPS connection manager 605 (step 850), and calls a client IPC 604 for using the RIPS layer of another DDS application (step 860). The DCPS connection manager 605 stores information on the RIPS layer being executed in the node. The DCPS connection manager 605 connects the client IPC connection structure 604 to a server IPC connection structure 406 of another DDS application 401 in which the RIPS layer is being executed in advance (step 870). Then, the DDS application 601 uses the RIPS layer 408 of another DDS application 401 (step 880).

Figure 9:
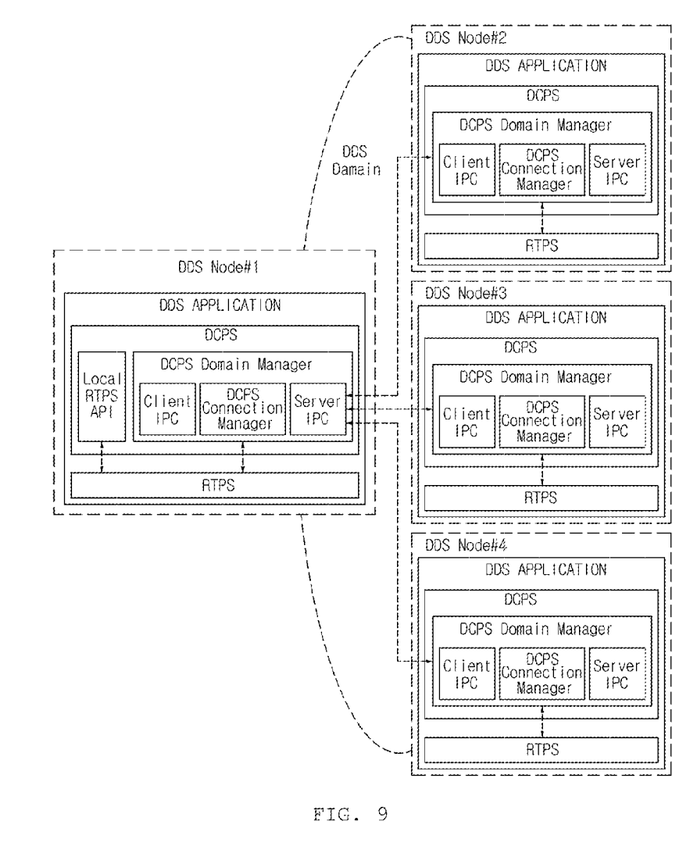
FIG. 9 is a DDS structure according to an exemplary embodiment of the present invention.

FIG. 9 is a DDS structure according to an exemplary embodiment of the present invention in which a plurality of nodes exist in one domain, and in the case where a DDS application is generated in each node, an RIPS layer of one node is shared by the other DDS applications. Referring to FIG. 9, a DDS application of a node No. 1 includes an RIPS layer and the DDS application uses its RIPS layer by using a local RIPS API. Meanwhile, DDS applications of the other nodes, a second node, a third node, and a fourth node do not include any RIPS layer and use the RIPS layer of the DDS application of the node No. 1. Therefore, the DDS applications of the nodes Nos. 2, 3, and 4 do not need any local RIPS API. In order for each of the DDS applications of the nodes Nos. 2, 3, and 4 to use the RIPS layer of the DDS application of the node No. 1, a client IPC connection structure of each of the DDS applications of the nodes Nos. 2, 3, and 4 is connected to a server IPC connection structure of the DDS application of the node No. 1, and a DCPS layer of each of the DDS applications of the nodes Nos. 2, 3, and 4 is communicated with the RIPS layer of the DDS application of the node No. 1.

According to the exemplary embodiment of the present invention, DDS applications of a plurality of nodes belonging to the same domain can use an RIPS layer of a DDS application of a specific node of the plurality of nodes. Therefore, it is possible to suppress propagation of discovery and more efficiently perform message communication between nodes.

Figure 10:
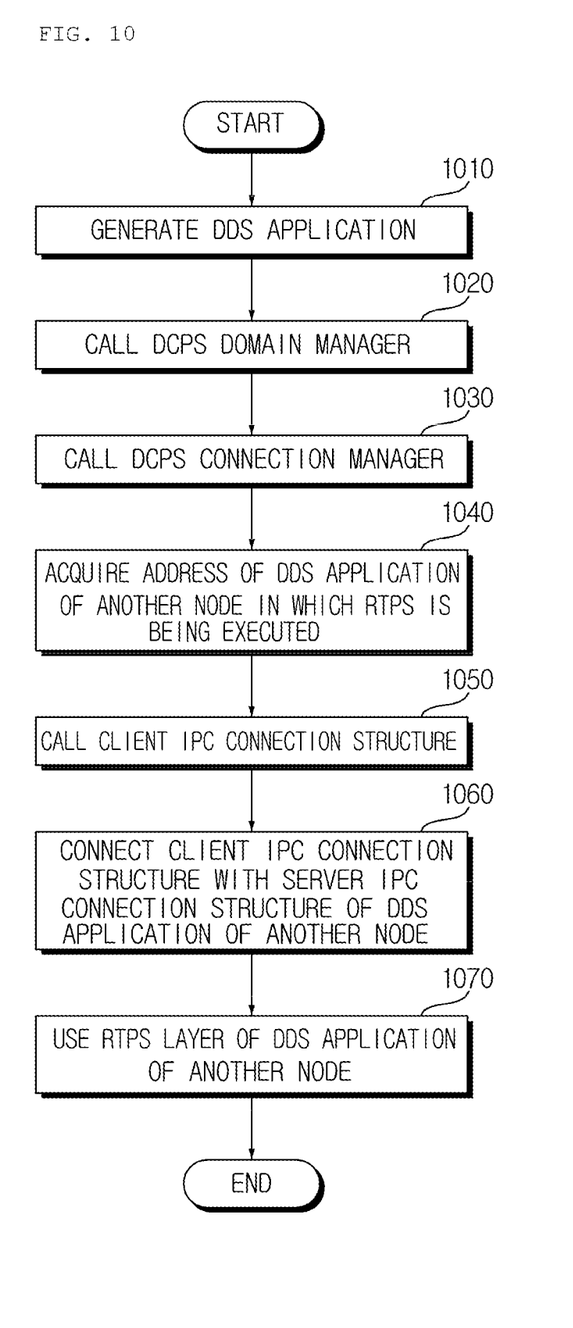
FIG. 10 is a flow chart illustrating a process through which DDS applications of a plurality of nodes in one domain share a RTPS layer of a specific DDS application of a specific node of the domain.

FIG. 10 is a flow chart illustrating a process through which DDS applications of a plurality of nodes in one domain share a RIPS layer of a specific DDS application of a specific node of the domain as shown in FIG. 9.

If a DDS application is generated in a node of a domain (step 1010), the DDS application calls a DCPS domain manager (step 1020). The DCPS domain manager calls a DCPS connection manager (step 1030), and acquires an address of a DDS application of another node of the same domain in which a RIPS is being executed (step 1040). Then, in order to use the RIPS layer of the DDS application of another node on the basis of the acquired information, a client IPC connection structure is called (step 1050). The DCPS connection manager stores information on the RIPS layer being executed in another node of the same domain. The DCPS connection manager connects the client IPC connection structure to a server IPC connection structure of the DDS application of another node in which the RIPS layer is being executed (step 1060). Then, the DDS application uses the RIPS layer of the DDS application of another node (step 1070).

Figure 11:
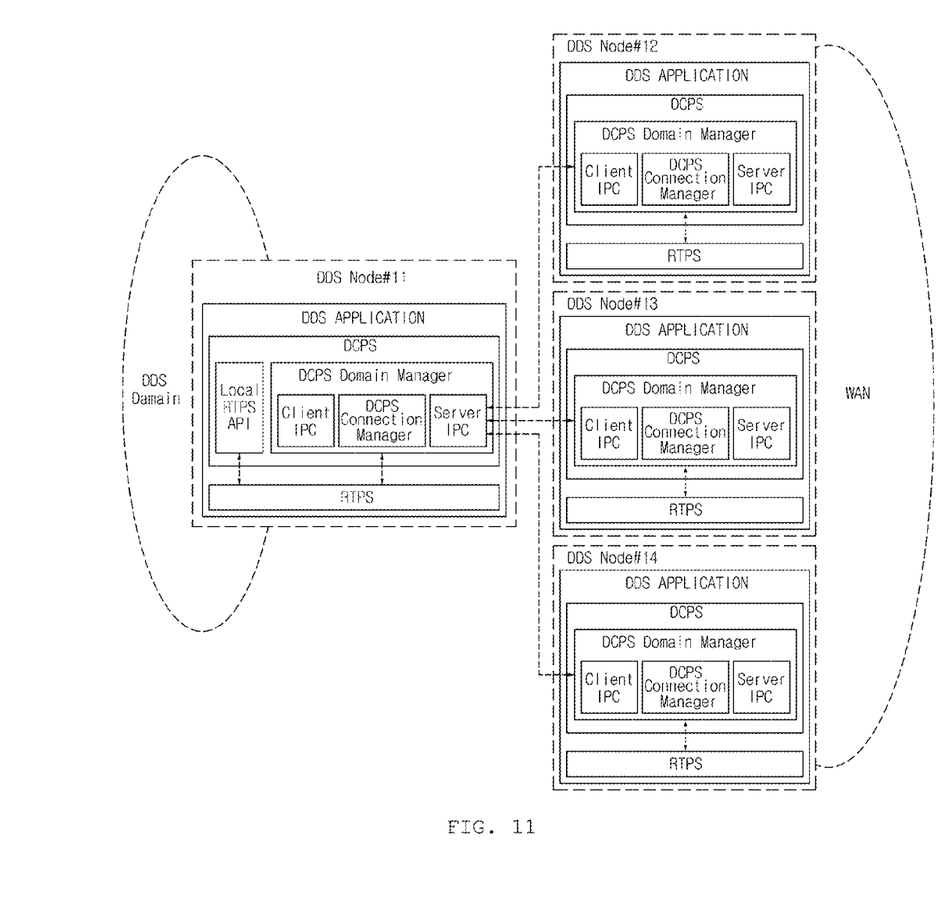
FIG. 11 is a DDS structure according to another exemplary embodiment of the present invention.

FIG. 11 is a DDS structure according to another exemplary embodiment of the present invention in which an RIPS layer of a DDS application of a DDS domain is shared by a DDS application of a node existing in an external WAN environment of the DDS domain. Referring to FIG. 11, a node No. 11 participates in a domain but nodes Nos. 12, 13, and 14 do not participate in the domain. In this case, in order to use DDS, in general, the nodes Nos. 12, 13, and 14 should use a DDS router provided in the domain. In this exemplary embodiment, DDS applications of the nodes Nos. 12, 13, and 14 can use DDS without a DDS router by using an RIPS layer of the DDS application of the node No. 11 belonging to the domain. In order for each of the DDS applications of the nodes Nos. 12, 13, and 14 to use the RIPS layer of the DDS application of the node No. 11, a client IPC connection structure of each of the DDS applications of the nodes Nos. 12, 13, and 14 is connected to a server IPC connection structure of the DDS application of the node No. 11 such that a DCPS layer of each of the DDS applications of the nodes Nos. 12, 13, and 14 is communicated with the RIPS layer of the DDS application of the node No. 11.

According to the exemplary embodiments of the present invention, an external DDS application which could not participate in a DDS domain can use a DDS from the external of the DDS domain without a DDS router by using an RIPS layer of a DDS application of a participant node constituting the DDS domain.

Figure 12:
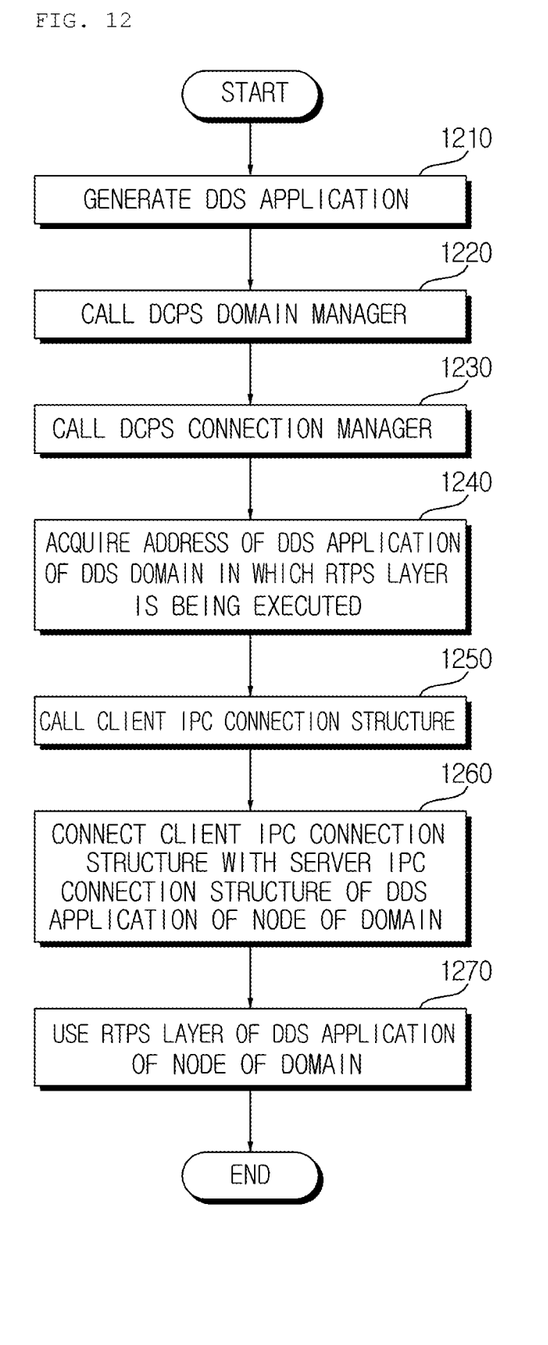
FIG. 12 is a flow chart illustrating a process through which an RTPS layer of a DDS application in a DDS domain is shared by a DDS application of a node existing in an external WAN environment of the DDS domain.

FIG. 12 is a flow chart illustrating a process through which an RIPS layer of a DDS application in a DDS domain is shared by a DDS application of a node existing in an external WAN environment of the DDS domain as shown in FIG. 11.

If a DDS application is generated in a node existing an external WAN environment of a DDS domain (step 1210), the DDS application calls a DCPS domain manager (step 1220). The DCPS domain manager calls a DCPS connection manager (step 1230), and acquires an address of a DDS application of a node of the domain in which a RIPS is being executed (step 1240). Then, in order to use the RIPS layer of the DDS application of the node of the domain on the basis of the acquired information, a client IPC connection structure is called (step 1250). The DCPS connection manager stores information on the RIPS layer being executed in the node of the domain. The DCPS connection manager connects the client IPC connection structure to a server IPC connection structure of the DDS application of the node of the domain in which the RTPS layer is being executed (step 1260). Then, the DDS application in the external WAN environment uses the RIPS layer of the DDS application of the node in the DDS domain (step 1270).

Meanwhile, the exemplary embodiments of the present invention described above may be created as programs executable in a computer, and may be implemented in a general-purpose digital computer executing the programs by using a recording medium readable by the computer. Examples of the recording medium readable by the computer include a magnetic storage medium (for example, a ROM, a floppy disk, a hard disk, etc.), an optically readable medium (for example, a CD-ROM, a DVD, etc.), and other storage media.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A computing device constituting a data distribution service (DDS) structure, comprising:
    a processor; and
    a non-transitory computer-readable storage medium having
        a kernel module being modifiable and including a first real-time publish-subscribe (RTPS) layer in which a part of RTPS functions is implemented;
        a first DDS application including a first data-centric publish-subscribe (DCPS) layer and a second RTPS layer in which the other RTPS functions,
            wherein the DCPS layer includes an RTPS socket application programming interface (API) application configured to set an RTPS socket of the second RTPS layer,
            wherein the second RTPS layer is configured to transmit information relating to the RTPS socket of the second RTPS layer to a low-level socket of the first RTPS layer, wherein the first RTPS layer is configured to generate an RTPS mapping table using the received information relating to the RTPS socket of the second RTPS layer, and wherein the first RTPS layer transmits the RTPS mapping table to the RTPS socket of the second RTPS layer; and a second DDS application including a second DCPS layer communicating with the first RTPS layer, wherein the first DCPS layer and the second DCPS layer each includes a DCPS Domain Manager, wherein each DCPS Domain Manager includes a client IPC connection structure, a server IPC connection structure, and a DCPS Connection Manager, wherein the server IPC connection structure of the first DCPS layer is configured to enable the second DDS application to use the first RTPS layer, wherein the client IPC connection structure of the second DCPS layer is configured to enable the second DDS application to use the first RTPS layer, and wherein the client IPC connection structures and the server IPC connection structures are a shared message queue or a socket.

2. The computing device of claim 1, wherein the part of the RTPS functions includes at least one a discovery function, a data reception function, and an RTPS message generating function.

3. The computing device of claim 1, wherein the other RTPS functions include at least one of a history cache function and an RTPS message control function.

4. The computing device of claim 1, wherein the second RTPS layer includes an RTPS socket performing connection between the second RTPS layer and the first RTPS layer and receives data received by the first RTPS layer from the first RTPS layer in a socket form.

5. The computing device of claim 1, wherein the RTPS mapping table includes registration data for the RTPS socket of the second RTPS layer.

6. A computing device constituting a data distribution service (DDS) structure, comprising:
a processor; and
a non-transitory computer-readable storage medium having
a first DDS application including a first data-centric publish-subscribe (DCPS) layer and a first real-time publish-subscribe (RTPS) layer; and
a second DDS application including a second DCPS layer communicating with the first RTPS layer,
wherein the first DCPS layer and the second DCPS layer each includes a DCPS Domain Manager,
wherein each DCPS Domain Manager includes a client IPC connection structure, a server IPC connection structure, and a DCPS Connection Manager,
wherein the server IPC connection structure of the first DCPS layer is configured to enable the second DDS application to use the first RTPS layer,
wherein the client IPC connection structure of the second DCPS layer is configured to enable the second DDS application to use the first RTPS layer, and
wherein the client IPC connection structures and the server IPC connection structures are a shared message queue or a socket.

7. The computing device of claim 6, wherein the server IPC connection structure or the client IPC connection structure is a socket.

8. The computing device of claim 6, wherein the first DCPS layer includes a local API for enabling the first DDS application to use the first RTPS layer.

9. A data distribution service (DDS) structure, comprising:
a first computing device including a first DDS application having a first data-centric publish-subscribe (DCPS) layer and a real-time publish-subscribe (RTPS) layer; and
a second computing device including a second DDS application having a second DCPS layer communicating with the first RTPS layer,
wherein the first DCPS layer and the second DCPS layer each includes a DCPS Domain Manager,
wherein each DCPS Domain Manager includes a client IPC connection structure, a server IPC connection structure, and a DCPS Connection Manager,
wherein the server IPC connection structure of the first DCPS layer is configured to enable the second DDS application to use the first RTPS layer,
wherein the client IPC connection structure of the second DCPS layer is configured to enable the second DDS application to use the first RTPS layer, and
wherein the client IPC connection structures and the server IPC connection structures are a shared message queue or a socket.

10. The DDS structure of claim 9, wherein the first computing device and the second computing device belong to the same DDS domain.

11. The DDS structure of claim 9, wherein the first computing device belongs to a DDS domain and the second computing device belongs to an external WAN environment of the DDS domain.

12. The DDS structure of claim 9, wherein the server IPC connection structure or the client IPC connection structure is a socket.

13. The DDS structure of claim 9, wherein the first DCPS layer includes a local API for enabling the first DDS application to use the first RTPS layer.

14. The computing device of claim 5, wherein the registration data for the RTPS socket of the second RTPS layer includes a Domainparticipant Identification (ID), a Topic ID, or a Datareader/Datawriter ID.

15. The computing device of claim 6, wherein the DCPS Domain Manager of the first DCPS application is configured to generate the first RTPS layer when the DCPS Domain Manager determines that no RTPS layer is being executed in the computing device.

16. The computing device of claim 6, wherein the DCPS Domain Manager of the second DCPS application is configured to
call the DCPS Connection Manager of the second DCPS application,
call the client IPC Connection Structure of the second DCPS application,
store an information relating to the first RTPS layer being executed in the node, and
connect the client IPC connection structure to the server IPC connection structure of the first DCPS application.

17. The DDS structure of claim 9, wherein the DCPS Domain Manager of the second DCPS application is configured to
call the DCPS Connection Manager of the second DCPS application,
call the client IPC Connection Structure of the second DCPS application, store an information relating to the first RTPS layer being executed in the node, and connect the client IPC connection structure to the server IPC connection structure of the first DCPS application.

18. The computing device of claim 6, wherein the server IPC connection structure or the client IPC connection structure is a message queue.

19. The DDS structure of claim 9, wherein the server IPC connection structure or the client IPC connection structure is a message queue.

* * * * *